G. B. SMITH.
MACHINE FOR MAKING BED FABRIC.
APPLICATION FILED APR. 11, 1914.

1,153,266.

Patented Sept. 14, 1915.
8 SHEETS—SHEET 5.

Witnesses

Gary B. Smith Inventor
by
Attorneys

G. B. SMITH.
MACHINE FOR MAKING BED FABRIC.
APPLICATION FILED APR. 11, 1914.

1,153,266.

Patented Sept. 14, 1915.
8 SHEETS—SHEET 8.

UNITED STATES PATENT OFFICE.

GARY B. SMITH, OF CHICAGO, ILLINOIS.

MACHINE FOR MAKING BED FABRIC.

1,153,266.  Specification of Letters Patent.  Patented Sept. 14, 1915.

Application filed April 11, 1914. Serial No. 831,121.

*To all whom it may concern:*

Be it known that I, GARY B. SMITH, a citizen of the United States, residing at Chicago, in the county of Cook and State of Illinois, have invented a new and useful Machine for Making Bed Fabric, of which the following is a specification.

The device forming the subject matter of this application is a machine for making bed fabrics of that general type which consists of parallel chains of links connected by cross ties.

One object of the present invention is to provide novel means whereby, after the wire from which the link is made, has been advanced and released, the wire will be suddenly and positively retracted before the wire is severed, thereby insuring a proper concatenation of the links.

Another object of the invention is to provide novel means whereby the rollers of the wire feeding mechanism will be rendered inoperative, simultaneously with the rendering inoperative of a grip which, being mounted upon a slidable cross head serves to advance the stock or wire.

Another object of the invention is to improve the driving mechanism whereby various portions of the machine are actuated.

It is within the scope of the invention to provide means whereby, at the will of the operator, certain bending instrumentalities may be disposed in adjusted positions, thereby to vary the length of the link.

The invention contemplates the provision of novel means for moving the chain of links forwardly.

One object in view in the present invention is to improve the assembling mechanism and another object is to improve the means whereby the cross ties are clenched onto the parallel portions of the chain of links when the latter is upon the holding drums.

It is within the scope of the invention to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings: Fig. 2 is a side elevation of the link fashioning and chain making mechanism, the assembly device being omitted; Fig. 7 is an end elevation of the compression arm which extends to the extreme right hand end of Fig. 5; Fig. 35 is a fragmental elevation showing the gate in the link and chain making portion of the structure; Fig. 36 is a diagrammatic view alluded to in the description of the operation of the link and chain making portion of the device; Fig. 37 is an end elevation of the compression member shown in Fig. 5; Fig. 38 is a perspective view of the delivery mechanism on the cross tie machine; Fig. 39 is a longitudinal section of the structure shown in Fig. 38; Fig. 40 is a sectional detail of the wire feed.

Figures 1, 17, 18, 19, 20, 21, 22, 28, 29:
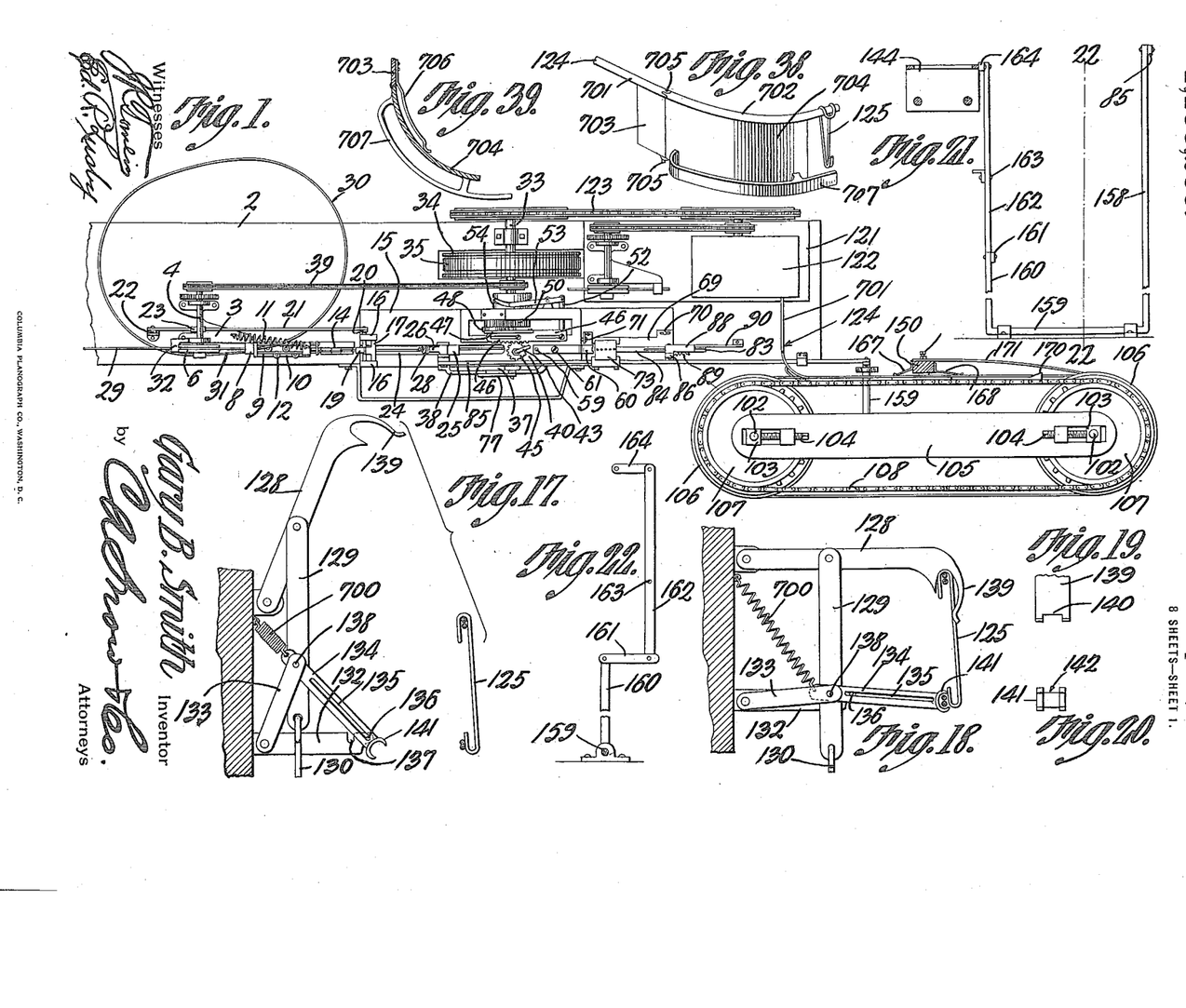
Figure 1 is a top plan depicting a machine constructed in accordance with the present invention.
Fig. 17 is a side elevation of the mechanism whereby the lower hooks of the cross ties are connected with the chain of links, the mechanism being in inoperative position with respect to the cross tie.
Fig. 18 is a side elevation of the structure shown in Fig. 17, the parts, however, being lowered into operative relation with respect to the cross tie.
Fig. 19 is an end elevation showing the finger which coöperates with the cross tie as shown in Fig. 18.
Fig. 20 is an end elevation of the fork shaped head which lies at the lower right hand corner of the mechanism shown in Fig. 18.
Fig. 21 is an elevation showing the mechanism whereby the carriage of the assembly device is actuated.
Fig. 22 is a vertical cross section taken approximately on the line 22—22 of Fig. 21.
Fig. 28 is a top plan illustrating a modified means for actuating the hammer of the assembly mechanism.
Fig. 29 is a plan illustrating a modification in the assembly mechanism.
Figures 5, 6, 8, 9, 10, 11, 21, 23, 24, 25, 26, 27:
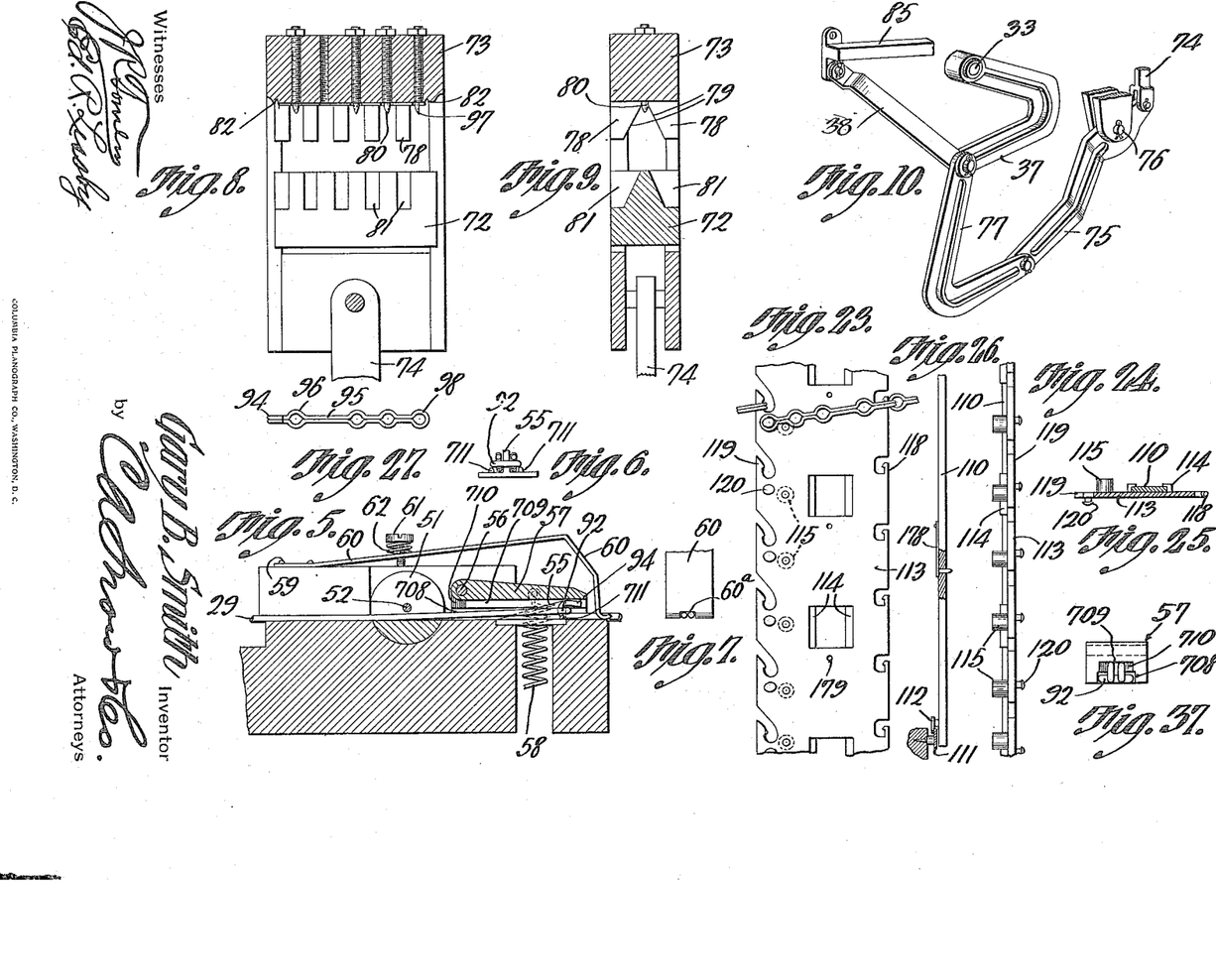
Fig. 5 is a vertical sectional detail of the combined cutting and bending member, together with adjacent parts, certain elements appearing in elevation.
Fig. 6 is an end elevation of the inclined lifting member shown near the right hand end of Fig. 5.
Fig. 8 is a sectional detail of the die and the anvil which coöperate to shape the links as shown in Fig. 27 beneath Fig. 8.
Fig. 9 is a sectional detail of the die and the anvil, the cutting plane being passed at right angles to the cutting plane in Fig. 8.
Fig. 10 is a perspective view showing certain parts which, being connected with one of the main shafts of the machine, transmits motion to sundry movable parts.
Fig. 11 is a front elevation of the assembly mechanism.
Fig. 23 is a fragmental elevation showing a portion of the support which travels around the drums of the assembly mechanism.
Fig. 24 is an elevation of the support shown in Fig. 23, the parts being viewed at right angles to the showing of Fig. 23, so as to show the edge of the element under consideration.
Fig. 25 is a cross section taken through the support shown in Figs. 23 and 24 and through the guide rod upon which the support reciprocates.
Fig. 26 is an elevation showing the edge of the bar upon which the support reciprocates, portions appearing in section.
Fig. 27 is a plan of the link which is turned out in the machine shown in Fig. 2.
Figure 11:
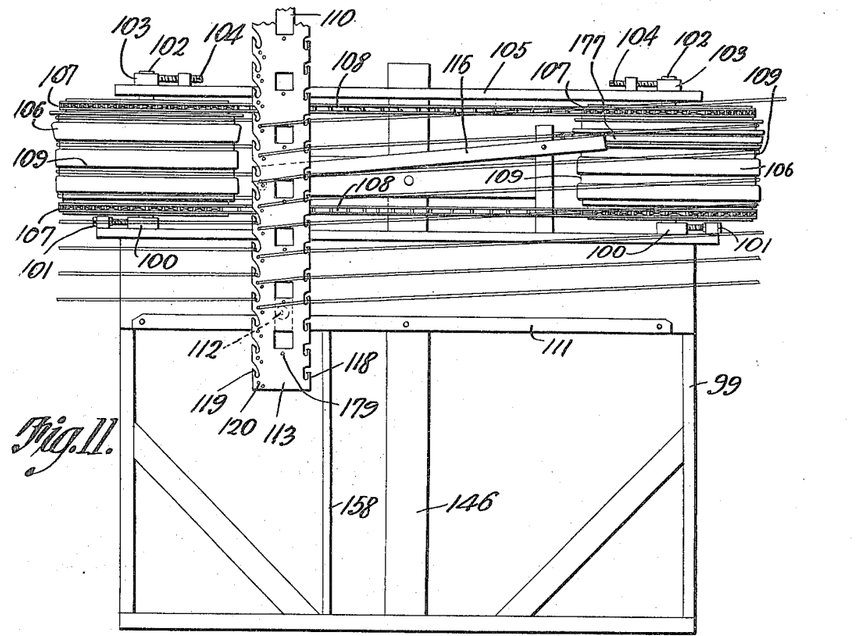

In order to understand in a general way the operation of the machine herein disclosed, Fig. 36 and Fig. 27 may be referred to. As shown in Fig. 36, a length of wire 29 is bent upon itself as shown at 92 and is cut off as at 93 to form a staple shaped element, the ends of which are turned up to form hooks 94. Referring to Fig. 27, the side portions of the staple shaped element are crowded together as shown at 95 and eyes 96 are formed therein. An eye 98 existing at one end of the link is assembled with the hooks 94 and thus a chain is formed. The chain is carried around a pair of upright drums in a plurality of convolutions as depicted, for instance in Figs. 11 and 30. Cross ties 125 of the general shape shown in Figs. 17 and 18 are fed downwardly and are connected with the links of the chain. The hooks at the ends of the cross ties 125 are clenched down, and thus a completed fabric is formed.

The machine herein disclosed resembles in many particulars, the devices shown in my co-pending applications Serial Nos. 728,915 and 755,100 (Patents No. 1,114,402 and 1,116,506). Since sundry portions of the machine shown in this application have become a part of the prior art, the description in this application may be shortened accordingly, reference being had to the disclosure above identified.

In carrying out the present invention there is provided as shown in Fig. 2, a supporting structure 1 comprising a table 2. Mounted upon the table 2 is a frame denoted generally by the numeral 3 and including as clearly shown in Fig. 3, a guiding eye 32. The frame 3 supports a wire feeding mechanism comprising shafts 4 and 5, the shaft 4 preferably being spring depressed, to maintain in coacting relation, feed wheels 6 and 7 on the shafts 4 and 5 respectively. As shown in Fig. 4, the frame 3 includes a lateral extension 8 from which project guide rods 9. Mounted for a limited reciprocation on the guide rods 9 is a carriage 10, retracted by a tension spring 11 attached to the carriage and to some fixed element, such as the frame 3. The carriage 10 is provided with horizontal straightening rolls 12 and vertical straightening rolls 14.

Figure 3:
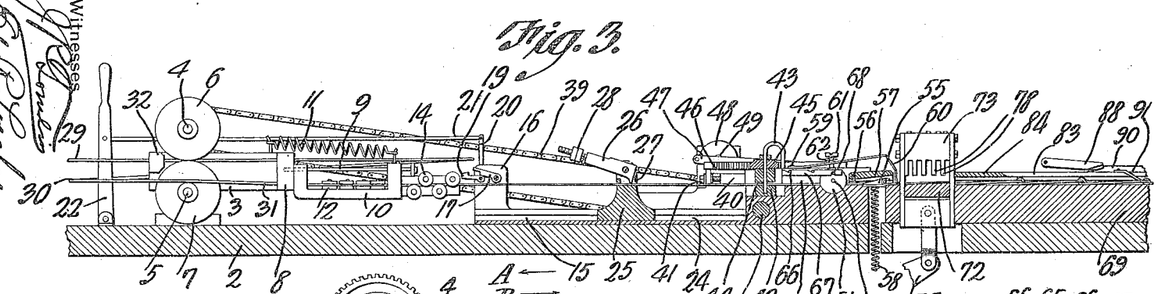
Fig. 3 is an enlarged longitudinal section of the link forming and chain making mechanisms.
Figures 3, 4:
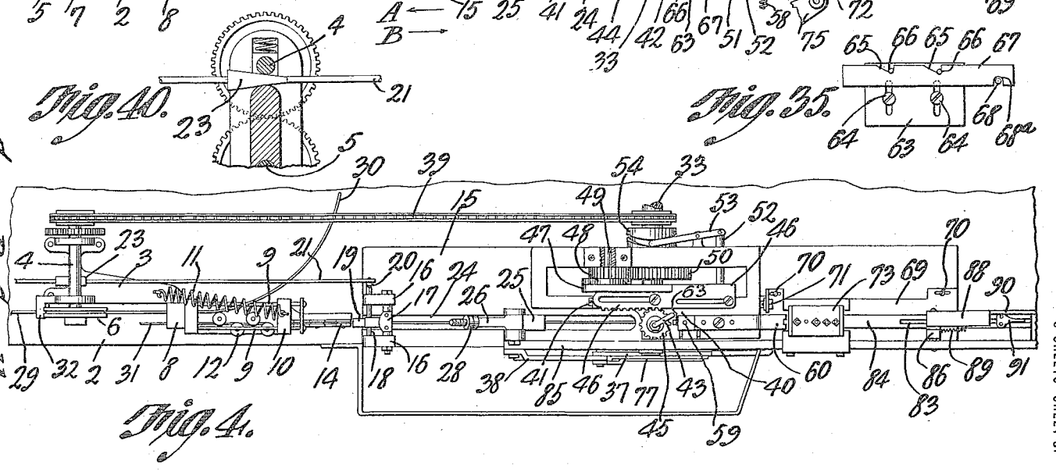
Fig. 4 is a top plan of the link forming and chain making means, the assembly mechanism being omitted and the scale in Fig. 4 being slightly larger than the scale in Fig. 1.
Figures 4, 4B:
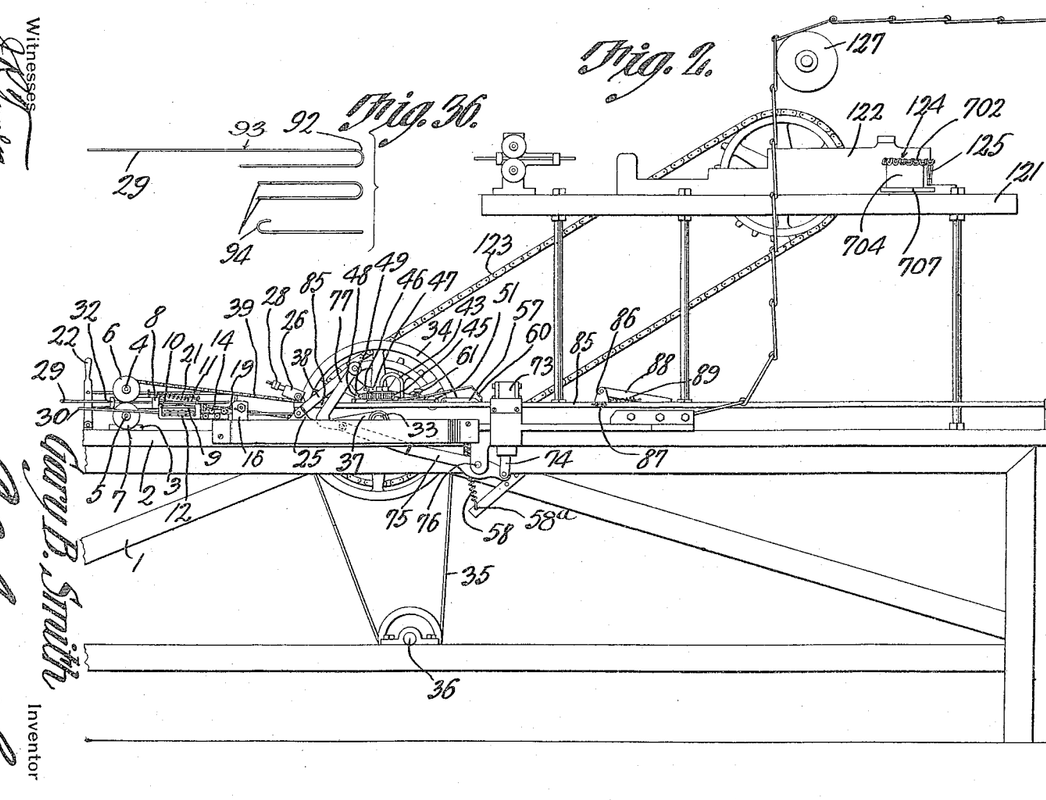

Superposed upon the table 2 is a bed plate 15 equipped near its rear end with supports 16 which are shown clearly in Figs. 3 and 4. Mounted to swing on the supports 16 is a trip 17. Journaled in the supports 16 is a rock shaft 18 carrying a movable member or arm 19. When the rock shaft 18 is actuated, the movable member or arm 19 is adapted to be brought into a common plane with the upper face of the trip 17, for a purpose which will be set forth hereinafter. Upstanding from one end of the rock shaft 18, as shown in Fig. 3, is a crank arm 20 pivoted to a rearwardly extending pitman 21 operatively connected with a lever 22 fulcrumed on the table 2. The pitman 21 carries, as shown in Fig. 4, a wedge 23 lying beneath the spring depressed shaft 4 of the feeding mechanism.

The bed plate 15 is equipped with a guide 24 in which is mounted to reciprocate a cross head 25 carrying a pivoted grip 26, the cross head being provided with a stop 27 which prevents the rear end of the grip 26 from dropping too far downwardly. Mounted on the rear end of the grip 26 is an adjustable catch preferably taking the form of superposed nuts 28.

The wire from which the links are fashioned is denoted by the numeral 29. The wire 29 passes through the guiding eye 32 and is formed into a convolution 30, the wire passing between feed wheels 6 and 7 prior to being formed into the convolution, and passing also through the lateral extension 8 on the frame 3. As shown at 31 in Fig. 4, the wire is extended again through the extension 8 and is passed between the straightening rolls 12—12 and 14—14 on the carriage 10. Thence, the wire passes between the forward end of the grip 26 and the cross head 25, as shown in Fig. 3.

The operation of the structure as thus far described is as follows: When the shafts 4 and 5 are driven, the wire is advanced to form the convolution 30. When the cross head 25 moves in the direction of the arrow A in Fig. 3, the nuts 28 on the grip 26 ride up onto the trip 17 and engage the rear end of the trip. Then, as the cross head 25 is moved in the direction of the arrow B the wire 29 will be advanced, because, when the trip 17 is swung upwardly by the action of the nuts 28, the grip 26 will have been tilted so that it will have engaged the wire 29 and bound the same against the cross head 25. Now so soon as the cross head 25 is started back in the direction of the arrow A, the hold of the grip 26 on the wire 29 will be released, because the wire is relatively stationary. Therefore, as the cross head 25 is reciprocated in the direction of the arrows A and B, the wire 29 will be advanced by a step by step movement. When the wire 29 is advanced as above described, the slidable carriage 10 will be advanced also, owing to the frictional hold of the straightening rolls 12 and 14 upon the wire 29 and as the carriage 10 is advanced, the spring 11 will be put under tension. When the cross head 25 starts to move back in the direction of the arrow A and when the hold of the grip 26 on the wire 29 is released, as hereinbefore described, the carriage will be drawn back sharply and suddenly by the action of the spring 11, effecting a corresponding abrupt retraction of the wire 29. The object in thus retracting the wire 29 will be alluded to at the proper point in the description of the invention. At times it is desirable that the cross head 25 should reciprocate freely without advancing the wire 29. When such an operation is desired, the lever 22 is tilted, advancing the pitman 21 and rotating the rock shaft 18 until the arm 19 thereon is alined with the upper surface of the trip 17, this operation being clearly understood from Fig. 3. When the upper surface of the arm 19 on the rock shaft 18 is alined with the upper surface of the trip 17, the abutment nuts 28 on the trip 26 will slide from the trip 17 onto the arm 19, without locking behind the rear end of the trip 17 and tilting the trip. Consequently, the grip 26 will not be tilted sufficiently to cause it to engage the wire 29 and bind the wire against the cross-head 25. It will now be understood that by manipulating the lever 22, the parts of the machine will be so positioned that the cross-head 25 may be moved back and forth in the direction of the arrows A and B without advancing the wire 29. In this connection it is to be noted that when the pitman 21 moves in the direction of the arrow B, the wedge 23 on the pitman, engaging beneath the spring-depressed shaft 4 of the wire feeding means, will raise the said shaft and elevate the feed wheel 6 out of operative relation to the feed wheel 7 and off the wire. Therefore, the feeding of the wire 29 is stopped, not only so far as the cross-head 25 is concerned, but also so far as the feeding mechanism 6—7 is concerned.

From the description as thus far given it will be understood that the wire 29 is fed forward in predetermined lengths, intermittently.

I will now describe the means whereby the cross-head 25 is moved to and fro, and whereby the feeding mechanism 6—7 is actuated. Extended transversely of the frame of the machine and journaled therein is a shaft 33 provided at one end, as shown in Fig. 2, with a belt wheel 34 about which is trained a belt 35, operatively connected with a drive shaft 36 journaled on the supporting structure 1. Noting Figs. 10 and 2, it will be seen that a U-shaped crank 37 is attached to one end of the shaft 33, the crank being connected by a link 38 to a rod 85 (hereinafter referred to in detail) the rod 85 being attached to the cross head 25. Thus, when the shaft 33 is rotated, a reciprocating movement will be imparted to the cross head 25 through the medium of the crank 37 and the link 38. The shaft 4 of the wire feeding mechainsm is actuated from the shaft 33 by means of a belt or sprocket chain 39 operatively connecting these elements. After the wire 29 has been advanced, the next step is to put a bend therein, as indicated at 92 in Fig. 36. The mechanism for fashioning the bend 92 will now be set forth in detail. Fixedly held upon the frame work of the machine, but adjustable longitudinally of the machine, is a support 40, held in place by means of a set-screw 41, engaging the machine frame. Journaled for rotation in the support 40 is a bending shaft 42. A curved or approximately U-shaped member 43 has one leg inserted into a central bore in the shaft 42, the other leg of the member 43 being fixed in a hole in the support 40, to prevent the U-shaped member 43 from turning when the shaft 42 rotates during the bending operation. The shaft 42 is provided with a transverse slot 44, extended part way therethrough. That leg of the U-shaped member 43 which is located in the bore of the shaft 42 extends across the slot 44. The wire is fed forward by the action of the cross head 25 and the free end of the wire passes through the slot 44 in the bending shaft. Then, when the bending shaft is rotated, the forward end of the wire 29 is swung backwardly, to form the bend 92 shown in Fig. 36. In order to procure an intermittent rocking movement in the bending shaft 43, the same is provided at its upper end with a pinion 45 meshing into a rack formed in one edge of a rack bar 46, the latter being mounted to reciprocate upon the machine frame. Pivoted to the rack bar 46 is a pitman 47 eccentrically connected with a crank disk 48 mounted upon a supplemental shaft 49 extended transversely of the machine frame and journaled therein. Upon the supplemental shaft 49 and the shaft 33 are intermeshing, interrupted pinions 50.

The construction above described is such that when the shaft 33 is rotated, a reciprocating rotary movement will be imparted to the bending shaft 42 through a gear-train comprising the pinions 50, the supplemental shaft 49, the pitman 47, the rack bar 46 and the pinion 45 on the bending shaft.

The next step, referring to Fig. 36, is to cut off the length of wire at the point indicated at 93, so that a staple shaped element is formed, the free ends of the staple shaped element being turned up to form hooks 94. Journaled for rotation in the machine frame is a horizontally disposed transversely extended cutting and bending shaft 51. A rocking or reciprocating movement is imparted to this shaft 51 by means of a rack formed on the under face of the rack bar 46. Noting Fig. 5, it will be obvious that when the shaft 51 is rotated, the same will cut off the wire at the point indicated by the reference character 93 in Fig. 36 and turn up the ends of the staple shaped element to form hooks 94. The bend made at 94 is formed around a shiftable fulcrum rod 52, mounted to slide longitudinally in the cutting and bending shaft 51. In order to retract the fulcrum rod 52 and to withdraw the operative end thereof from the hooks 94, the fulcrum rod 52 is connected as shown in Fig. 4 with a lever 53, fulcrumed intermediate its ends upon the machine frame and actuated by a cam disk 54 on the shaft 33. Mounted on the machine frame is an inclined guide 55. Before the wire is cut off as shown at 93, the bend 92 of the wire is advanced and elevated along the inclined guide 55 by the action of the cross head 25. The bend 92 of the wire then drops down over the end of the inclined guide 55, and is interengaged with the hooks 94 of a preceding link which has been substantially completed and is held between an anvil 72 and a die 73, to be described in detail hereinafter. It is at this time that the spring-retracted carriage 10 becomes operative, and before the wire is cut off as shown at 93, draws the wire sharply back, thus engaging the bend 92 with the hooks 94 of a completed link, and positions the body portion of the wire properly, to be cut by the action of the shaft 51, the arms of the staple-shaped element being of equal length, and no waste resulting, because the back bent end is not cut a second time. During the time that the bend 92 is being interengaged by the hooks 94 of a completed link, the bend 92 is held down by a compression member 57, pivotally supported as shown at 56 and drawn downwardly by means of a retractile spring 58, connected as indicated at 58$^a$ (Fig. 2) with any fixed part of the machine, it being understood that the particular means for securing the lower end of the spring 58 is immaterial.

Noting particularly Fig. 37 it will be seen that the compression member 57 is provided in its bottom with a relatively wide slot 708 which receives the bend 92 of the wire. At the top of the slot 708 is formed a restricted slot 709. At the other end of the slot 708 are inwardly inclined faces 710. As the substantially completed link is pulled back by the bend 92, the hooks 94 of the completed link are forced toward each other on opposite sides of the inclined guide 55 by coming in contact with the faces 710, and are thus held by projections 711, located on opposite sides of the inclined guide 55. In order to prevent a lifting of the completed link when the die 73 is raised, a spring arm 60 bears upon the completed link, as shown in Fig. 5, the arm 60 being secured at one end as shown at 59. The compressive effort of the arm 60 is regulated by means of a set-screw 61, engaging a spring 62 which bears upon the arm 60. As depicted in Fig. 7, the operative end of the arm 60 is slotted as shown at 60$^a$, to straddle the link. When the bend 92 is made, and when the free end of the wire is swung back as shown in Fig. 36 said end of the wire passes out of a slot in the side of the adjustable support 40 and in the machine frame, into which slot the wire has been fed previous to the bending operation. A closure or gate 63 is mounted to move toward and away from the slot in question, and acts as a guide when the looped end 92 of the wire is advanced and before the wire is cut off as shown at 93. The gate 63 may be slotted to receive supporting screws 64 and is actuated at the proper time by means of a bar 67 having pins 66 adapted to ride in inclined notches 65 in the gate 63. The bar 67 is actuated through the medium of an eccentric pin 68 mounted on the end of the cutting and bending shaft 51, and adapted to coact at the proper time with a notch 68ᵃ in the bar 67.

Reference has been made incidentally hereinbefore to the die 73 and the anvil 72. These elements are carried by a fixed but longitudinally adjustable support 69 which, as shown in Fig. 4, may be connected with the frame work of the machine by set screw and slot unions 70. The support 69 is adjusted and held in adjusted positions by means of a set screw 71 engaging the support and a portion of the machine frame. Owing to the fact that the support 69 may be adjusted in the direction of the length of the machine, and owing to the fact that the bending shaft 42 may be adjusted longitudinally of the machine by moving the support 40 through the medium of the set screw 41, the length of each link may be varied. Thus, it is never necessary to cut a link in order to accommodate a bed frame of any specified length, it being possible to adjust minutely the length of each link made, so that when all of the links are concatenated into a chain, the chain of links will be of the proper length. The anvil 72 is mounted on the adjustable support 69 and the die 73 is slidably mounted thereon for vertical movement. The means for procuring a vertical reciprocation of the die 73 will be understood best from Figs. 8, 2 and 10. Pivoted to the lower portion of the die 73 is a link 74 connected with a lever 75, fulcrumed intermediate its ends at 76 upon the machine frame. The rear end of the lever 75 is connected with an angular link 77, having a common mounting with the link 38 upon the crank arm 37.

From the foregoing it will be obvious that the gear train for actuating the die 73 comprises the shaft 33, the crank 37, the link 77, the lever 75 and the link 74.

Noting Fig. 9 it will be seen that the die 73 is provided with a plurality of fingers 78, the inner faces of which are inclined as shown at 79. Located between the pairs of fingers 78 are removable, adjustable prongs 80, shown in Fig. 8. The anvil 72 is equipped with recesses 81 adapted to receive the fingers 78 when the die 73 descends. The function of the inclined fingers 78 is to crowd the side arms of the link together, as shown at 95 in Fig. 27, the prongs 80 serving to form eyes 96 in the link. Adjacent its ends, the die 73 is provided with lugs 82. These lugs 82 act to clench down the hooks 94 as the die descends. As shown in Fig. 8, and as indicated at 97, one-half of one prong is cut away. This feature is desirable, because the particular prong in question is compelled to pass into the terminal eye 98, in which the hooks 94 of a preceding link are already engaged. After the several links have been concatenated into a chain as above described, the chain is advanced, and the function of the rod 85 will now be apparent, and this rod, as indicated in Fig. 10 is actuated by the cross head 25, which in its turn, is actuated by the link 38, the crank arm 37 and the shaft 33. As shown in Fig. 2, a support 86 is adjustably attached to the rod 85 as at 87. Pivoted to the support 86 is a dog 88, constrained by a spring 89 which extends between the dog and the support, to move in a recess or passage 83 (see Fig. 3) formed in the element 69. Overhanging the end of the passage 83 is a platform 84 and located adjacent the other end of the passage is a lifting cam 90. When the rod 85 is advanced, the dog 88 engages the chain of links in the recess 83 and advances the chain. The rod 85 has a longitudinal movement which is considerably in excess of the longitudinal movement which it is desired to impart to the chain of links, and, therefore, in order to render the dog 88 effective throughout a portion only of the stroke of the rod 85, the platform 84 and the lifting cam 90 are provided, the construction being such that after the rod 85 has moved forward to a certain extent, the dog 88 will ride up on the lifting cam 90 as shown in Fig. 3. When the rod 85 is retracted, the dog 88 will ride up onto the forward edge of the platform 84, the forward edge of the platform preferably being beveled to facilitate this operation. In order to prevent an accidental back-drag on the chain of concatenated links, a resilient back-stop pawl 91 is provided, the free end of the back-stop pawl entering the recess or passage 83 and engaging the chain of links, the free end of the back-stop pawl being so fashioned that it will prevent a backward movement of the chain without impeding the forward movement thereof.

The description as thus far proceeded with has pointed out how the links are fashioned and interengaged to form a chain. It now remains to point out how the cross ties are applied and how the completed fabric is taken care of. Comparing Fig. 11 with Fig. 1 it will be seen that a supplemental frame 99 is located adjacent the main supporting structure 1. The supporting frame 99 is provided adjacent its ends with bearings 100 which may be adjusted by means of set screws 101. Carried by the bearings 100 are shafts 102, the upper ends of which are mounted in bearings 103, controlled by set screw 104, the bearings and the set screws being mounted in a tie bar 105. This tie bar 105 may be of any desired length, and one tie bar may be replaced by another, depending upon the length of the fabric which is to be formed. Carried by the shafts 102 are drums 106 provided with sprocket wheels 107 around which are trained sprocket chains 108. The drums 106 are equipped with circumscribing grooves 109.

The invention includes an upright guide bar 110 shown in detail in Fig. 26, the guide bar 110 being secured to the sprocket chain 108. Mounted on the supplemental frame 99 are tracks 111 adapted to be engaged by a roller 112 on the guide bar 110, as clearly shown in Fig. 26.

Figures 12, 31, 33:
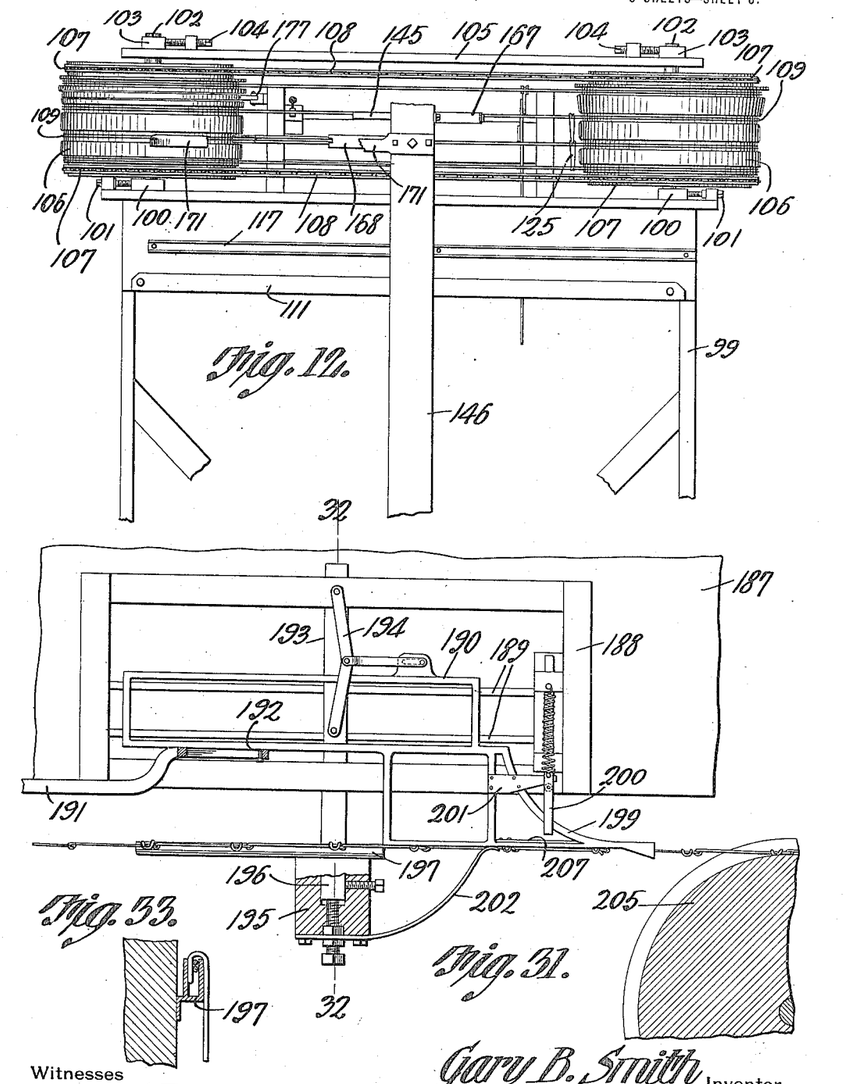
Fig. 12 is a rear elevation of the assembly mechanism.
Fig. 31 is a top plan, enlarged from Fig. 29, parts being broken away to disclose parts hidden in Fig. 29.
Fig. 33 is a fragmental transverse section showing the guide employed in that form of the invention disclosed in Fig. 29.

The invention includes a support 113, formed in a plurality of sections, there being fingers 114 struck from the support 113, these fingers 114 engaging the edges of the guide bar 110, as clearly shown in Fig. 25, the construction being such that the support 113 may move vertically upon the guide bar. Each section of the support 113 is provided with a roller 115. The roller 115 is adapted to pass beneath a cam bar 116 mounted on the supporting frame 99 at the front thereof as shown in Fig. 11. Thus, as the guide bar and the support move circumferentially of the drums 106, the support 113 will be caused to move downwardly on the guide bar 110 as these elements pass along the front of the supporting frame 99. On the back of the supporting frame 99 there is a channeled guide 117, shown in Fig. 12. This guide is adapted to receive one roller 115 on the support 113 as the same moves across the back of the supplemental frame 99. The bar 110 is prevented from being depressed, both at the front of the frame and at the back thereof, by reason of the fact that the roller 112 of the guide bar engages the tracks 111. On the guide 110 there is a spring finger 178 which interlocks with openings 179 in the support 113, disposed below the fingers 114 on the guide. This spring finger 178, serves to aid in supporting the member 113, but its hold thereon is not strong enough to prevent downward movement of the support 113 when the same is actuated by the cam bar 116. In its opposite edges, the support 113 is provided with fingers 118 and 119, as shown in Figs. 23 and 11. Adjacent the fingers 119 are pins 120.

Referring to Fig. 2 it will be seen that a supplemental frame 121 is mounted on the main supporting structure 1. Supported by the frame 121 is a machine 122 for making the cross ties. This machine 122 need not be described in detail, since its construction is shown in my co-pending application Serial No. 755,100 which has now matured into Patent No. 1,116,506. The cross tie machine 122 is operated from the shaft 33 by means of a belt 123 and includes a curved delivery arm 124 upon which the cross ties ultimately collect. One of the cross ties is shown in Fig. 17 and is there depicted by the reference numeral 125. The curved delivery arm 124 comprises a relatively fixed part 701 and a laterally movable part 702, reference being had particularly to Figs. 38 and 39. The fixed part has a depending flange 703 and the movable part 702 has a depending flange 704, said parts and their respective flanges being hingedly connected as at 705. The movable part 702 is swung to the left in Figs. 38 and 39 by means of a spring 706 secured to the flange 703 and bearing on the flange 704, the parts 701 and 702 abutting like a rule-joint hinge to limit the swinging movement of the part 702 and its flange to the left under the action of the spring 706. The flange 704 carries an offset cam strip 707.

Referring to Fig. 2, the completed chain of links is carried over suitable guide pulleys 127 and is carried forward and to the front of the assembling mechanism, as shown in Fig. 11. The chain of completed links is lodged in the grooves 109 in the drum 106, so that the chain passes around and around the drums as the latter are rotated. As the support 113 arrives at the front of the machine, the chain is parted manually, one end of the chain being connected with the finger 119. The other end of the chain is connected with the pin 120 and the finger 118. By this operation, the chain is parted into a plurality of lengths. Each one of these lengths ordinarily is long enough to make two bed fabrics and each length subsequently is divided by hand. However, since, as hereinbefore stated, the tie bar 105 may be of any length, each section of fabric may be long enough to make more than two complete beds. It has been stated hereinbefore that the completed cross ties made in the machine 122 traverse the delivery arm 24. Now as the chain support 113 moves along, the same strikes the cam strip 707 and swings the parts 702 of the delivery arm to one side, after which the spring 706 restores the part 702 to the position shown in Fig. 38. The cam strip 707, it will be understood, serves to space the chain support 113 from the part 702 and prevents the chain support from sweeping the cross ties off the part 702 of the delivery arm. From the delivery arm 124, the cross-ties drop onto certain convolutions of the chain of links which passes around the drums 106, although, if desired, the cross ties 125 may be removed manually from the delivery arm 124 and be connected with successive convolutions of a chain of links. When the cross tie drops onto a chain of links, the hook at the upper end of the cross tie 125 is engaged with one strand or convolution of the link chain, as shown in Fig. 17, the hook at the lower end of the cross tie, however, not yet being engaged with the next lower run of the link chain. In order to couple up the hook at the lower end of the cross tie with the lower run of the chain, a mechanism is provided which will now be described in detail, reference being had particularly to Figs. 17 and 18. Fulcrumed to swing upon the supplemental frame 99 is a lever 128 with which is connected a link 129 united with a connection 130, operatively connected with a pedal 131. Projecting from the supporting frame 99 is a bracket 132 to which is pivoted a link 133 united by a pivot element 138 with the link 129 and with an arm 134 having a slot 135 receiving a pin 136 on the bracket 132. In the bracket 132 is formed a slot 137 adapted to receive the pivot element 138. At the extremity of the lever 128 is formed a spring finger 139. As shown in Fig. 19, a notch 140 is formed in the extremity of the spring finger 139. The arm 134 terminates in a fork shaped head 141, notched in its extremities as shown at 142 in Fig. 20. The lever 128 and the pedal 131 are raised by the action of a spring 700, shown as extending between the support and the arm 134, although the spring may be located otherwise and still exercise its function.

Figure 13:
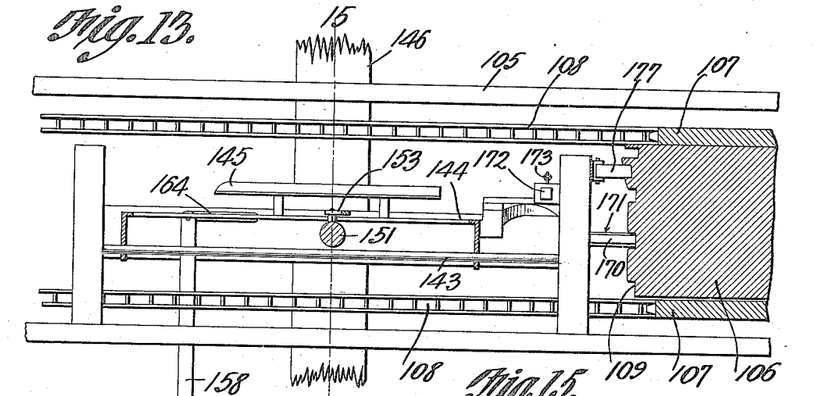
Fig. 13 is a longitudinal section of the assembly mechanism, the cutting plane being passed vertically.
Figure 15:
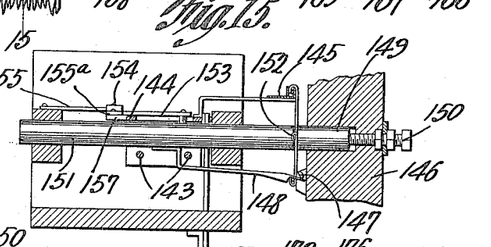
Fig. 15 is a cross section taken approximately on the line 15—15 of Fig. 13.
Figure 16:
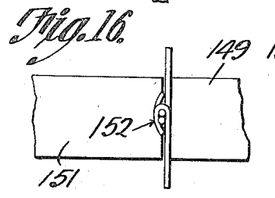
Fig. 16 is a side elevation of the anvil and the hammer which coöperate to clench the cross ties onto the chain of links.
Figure 28:
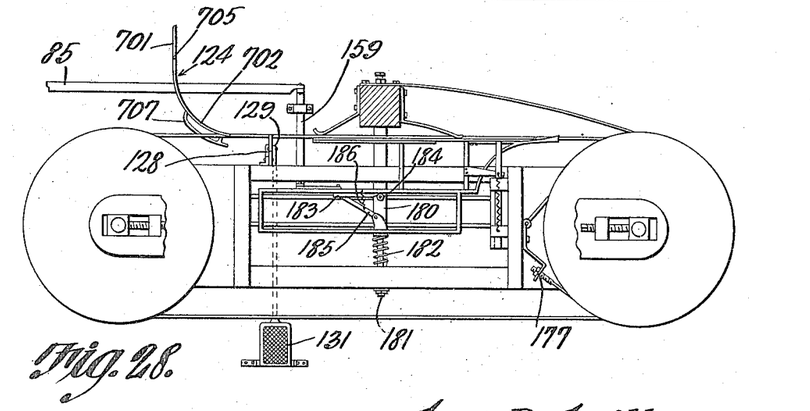
Figure 29:
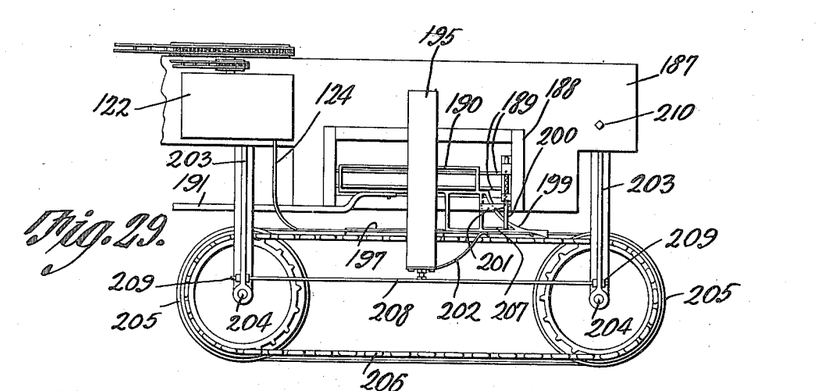

Comparing Figs. 17 and 18, it will be understood that when the pedal 131 is depressed, the lever 128 will be drawn downwardly. The cross tie 125 will be engaged in the notch 140 of the spring finger 139 and the latter will tend to swing the cross tie 125 inwardly so that the hook on the lower end of the cross tie engages with the chain. When the link 129 is moved downwardly, the arm 134 will be advanced and the fork shaped head 141 will act as a brace for the lower run of the chain, the hook at the lower end of the cross tie 125 entering the notches 142 of the fork 141 and snapping into the chain. By the operation above described, the cross tie 125 is connected with adjacent runs of the chain of links. It now remains to clench the hooks at the upper and lower ends of a pair of cross ties around the chain of links, as shown in Fig. 16. The mechanism for effecting this result will now be described in detail. Located between the drums 106 is a reciprocating carriage 144 supported for movement upon guides 143 carried by the supporting frame 99. Supported by the carriage 144 is a channel shaped guide 145, shown in Figs. 15 and 13, this guide receiving the hooks at the upper ends of the cross ties, while the hooks at the lower ends of the cross ties are being clenched, as will be understood clearly from Fig. 15. Mounted to the rear of the frame 99, as shown in Figs. 1 and 15 is a post 146, provided on its forward face with an inclined guide 147. Attached to a hammer 151 hereinafter described in detail, is a spring finger 148 adapted to lock over the lower run of a chain of links, as clearly shown in Fig. 15. The free end of the spring finger 148 engages with the inclined guide 147 and tightens up two adjacent cross ties 125, between the spring finger 148 and the guide 145, as clearly shown in Fig. 15, so that the inner ends of these cross ties will be adapted to be clenched. The clenching mechanism involves an anvil 149 mounted in the post 146 and held in adjusted positions by means of a screw 150. Coöperating with the anvil 149 and slidable in the frame 99 transversely thereof is the hammer 151, hereinbefore mentioned, the inner end of which is recessed, as shown at 152 in Fig. 16, so as to effect a proper clenching of the inner ends of a pair of cross ties around one strand of the chain of links. Noting Fig. 14 it will be observed that a link 153 is pivoted to the hammer 151, the link 153 being connected by means of a pivot element 154 with a link 155 on the frame, pivoted to a link 155ᵃ having a loose connection with a lug 157 on the carriage 144. It will now be obvious that when the carriage 144 is moved in one direction, the hammer 151 will be advanced, to coöperate with the anvil 149 and to clench the adjacent ends of a pair of cross ties, the hammer being retracted when the carriage is moved in an opposite direction. The carriage 144 is actuated from the rod 85. Note particularly Figs. 21 and 22. With the rod 85 is pivotally connected a crank arm 158 forming a part of a rock shaft 159 journaled in suitable bearings, the rock shaft 159 including an upstanding arm 160 connected by means of a link 161 with a lever 162 mounted as shown at 163 intermediate its ends, for swinging movement, there being a link 164 which connects the upper end of the lever 162 with the carriage 144.

Figures 14, 34:
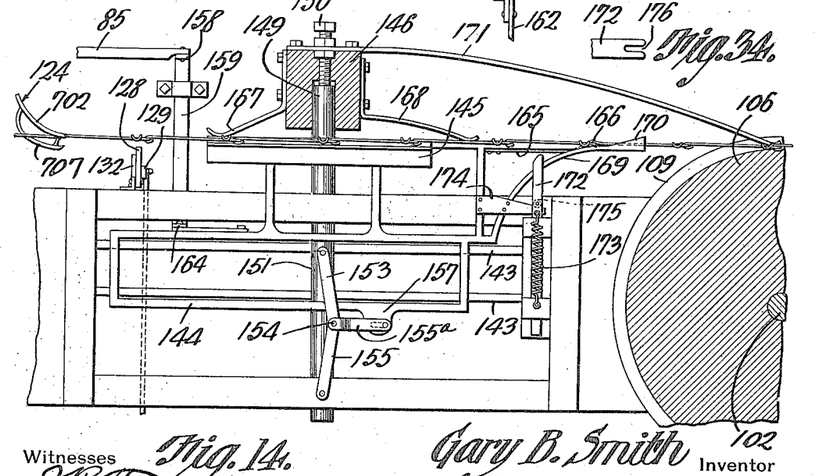
Fig. 14 is a top plan depicting the movable carriage of the assembly mechanism and the clenching means.
Fig. 34 is a fragmental side elevation of the latch in the assembly mechanism which acts as a backstop.

Noting particularly Fig. 14, a spring arm 165 is mounted on the carriage, the same terminating in a finger 166 the point of which enters one link of the chain. It will now be obvious that when the rod 85 is reciprocated as hereinbefore set forth, reciprocating motion will be imparted to the carriage, the chain of links being advanced and the drums 106 being rotated. A spring arm 167 projects from the post 146. This arm 167 serves to hold one strand of the chain of links in operative relation to the guide 145 on the carriage 144, it being obvious that when the support 113 passes between the guide 145 and the post 146, the chain of links would be held apart from the guide 145 in the absence of the finger 167. A spring arm 168 on the post 146 serves to hold the chain of links against the carriage 144. Projecting from the carriage 144 is an arm 169 terminating in a head 170 which is slotted to receive the chain of links and to hold the same in proper position to be engaged by the finger 166 on the end of the chain driving arm 165. Attached to the post 146 is a relatively long spring arm 171 which bears upon the chain of links adjacent one of the drums 106. In order to prevent the chain of links from being dragged backwardly by the action of the carriage 104, a latch 172 is mounted to slide in the frame 99 and is normally retracted by means of a spring 173 connected with the latch and with the frame. In order to advance the latch 172, a wedge or cam 174 is mounted on the carriage 144 and coöperates with a roller 175 on the latch. At its outer end, the latch 172 is slotted as shown at 176 in Fig. 34 so as to straddle the chain of links and to prevent a retrograde movement thereof. One of the drums 106 may be controlled by a suitable brake mechanism, indicated at 177. This brake mechanism may be of any desired form. As the support 113 is moved downwardly by the action of the cam bar 116, one section after another of the support may be removed from the lower end thereof and be connected with the upper end of the support, it being obvious that in the absence of such a construction, the lower end of the support might ultimately come into contact with the floor.

In Fig. 28 of the drawings, a modified means is shown for actuating the clenching hammer. In this figure, the hammer 180 is mounted to reciprocate in the supporting frame, as before stated and is provided with a squared end 181 slidable in the supporting frame. A compression spring 182 abuts against the frame and against a shoulder on the hammer to advance the hammer. Mounted on the carriage is a cam strip 183 beveled to coact with a roller 184 on the hammer. An arm 185 is pivoted to the carriage, one end of the arm being swung inwardly by the action of a spring 186. As the carriage moves to the right, the cam strip 183 engages the roller 184 and effects a slight initial retraction of the hammer 180, in order to free the hammer from the fabric, as the fabric is moved forwardly. As the carriage moves to the right, the roller 184 moves along the cam strip 183 and ultimately raises the inner end of the arm 185, putting the spring 186 under tension, the roller 184 passing beyond the left-hand end of the arm 185. Then, as the carriage moves to the left, the roller 184 traverses the outer edge of the arm 185 and retracts the hammer 180, putting the spring 182 under compression. Ultimately, the roller 184 rides off the right-hand end of the arm 185 and then the hammer 180 is advanced suddenly and forcibly by the action of the spring 182.

In Figs. 31, 32, 30, 29 and 33, a modified form of the invention is shown. In these figures of the drawings there is shown a supporting platform 187, corresponding to the platform 121. In this form of the invention, the assembling mechanism is given an overhead support, instead of being supported from underneath, by means of the frame 99. Mounted on the support 187 is a frame 188 having guides 189 on which the carriage 190 moves, the carriage being actuated by a rod 191, corresponding to the rod 85, the rod 191 being operatively connected with the carriage 190 by means of a pin and slot connection 192. The hammer 193 reciprocates in the frame 188 and is actuated by a mechanism 194 hereinbefore described. Secured to and upstanding from the support 187 is a curved post or arm 195 carrying the adjustable anvil 196. The guide 197 corresponding to the guide 145, is now fixed on the post 195 instead of being mounted on the carriage. The carriage-supported spring arm which draws the connected cross-ties downwardly, to tighten the same before they are clenched, is shown at 198 in Fig. 32, the operation of this detail having been gone into fully hereinbefore. The guide arm on the carriage is illustrated at 199 and the back-stop latch is shown at 200, the same being actuated by a cam strip 201 on the carriage. A spring arm 202 is mounted on the post 195 and exercises the same function as the spring arm 168 in Fig. 14. The chain feeding arm on the carriage is shown at 207. Brackets 203 are mounted on the support 187 and are connected with the upper ends of shafts 204 carrying drums 205 connected by sprocket chains 206. A spacing rod 208 connects the brackets 203 as shown in Fig. 29 and carries nuts 209 adapted to engage the brackets. One bracket, as shown in Fig. 29, is pivoted as at 210, so that the bracket in question may move when the nuts 209 are adjusted on the rod 208. Owing to this construction, the chains 206 which pass around the drums 205 may be tightened.

Figure 30:
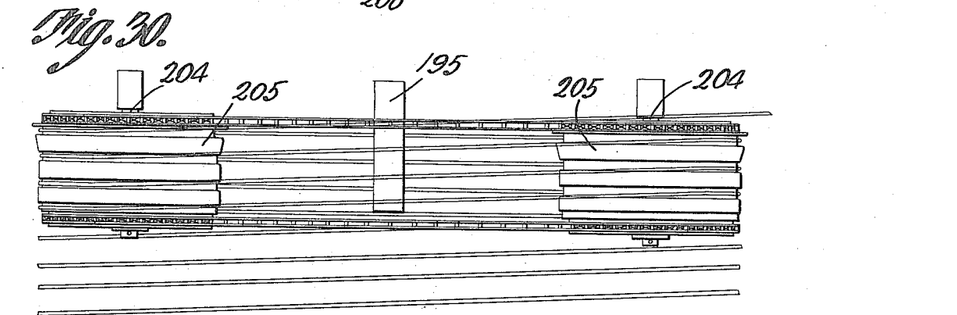
Fig. 30 is an elevation showing the drums of the assembly mechanism depicted in Fig. 29.
Figure 32:
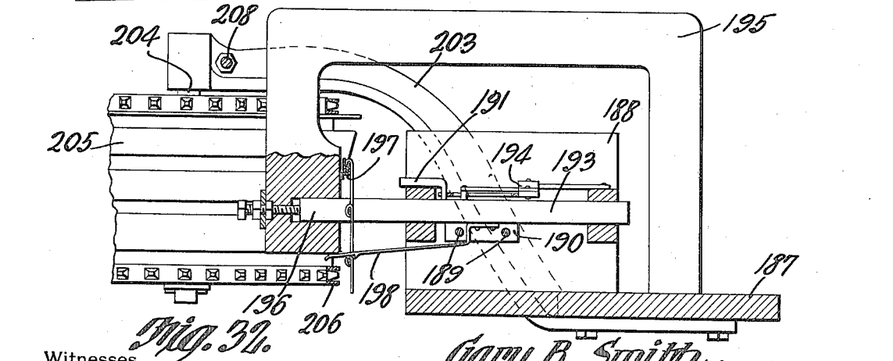
Fig. 32 is a vertical cross section taken approximately on the line 32—32 of Fig. 31.

In the form of the invention under discussion, the support 113 shown in Fig. 11 is not employed, the fabric being made in a continuous length, as shown in Fig. 30. Since the lower ends of the shafts 204 are free, the completed fabric in a tubular form, moves downwardly, and as the length of the tube of fabric increases, the lower end of the fabric may be pulled to the front or to the rear, out of the way.

The operation has been dealt with step by step, and a lengthy review thereof at this place is unnecessary. It may be stated, however, that through the medium of that portion of the machine which is depicted in Fig. 3, a length of wire is advanced and bent back upon itself to form a hook. The hook is cut off from the end of the length of wire and the ends of the hook, which has now assumed a staple shape, are bent up. The elements thus formed are concatenated into a chain and by the action of the die and anvil mechanism shown in Figs. 8 and 9 are spaced as shown in Fig. 27. The chain thus formed is received on the drums 106. The cross-ties 125 pass downwardly and hook up with the successive convolutions of the chain of links on the drum, and then the cross-ties are clenched onto spaced convolutions of the chain.

Having thus described the invention, what is claimed is:—

1. In a machine for making a bed fabric chain out of stock formed links, means for advancing the stock by successive steps; means for bending the stock into a hook; mechanism for severing the stock to transform the hook into a staple-shaped link; means for concatenating the link with a preceding link to form a chain; and means for retracting the stock between said steps and prior to the severing of the stock thereby to aline the end of the hook with the severing mechanism and to produce a link having arms of equal length, when the stock is severed by the severing mechanism.

2. In a machine for making a bed fabric chain out of stock-formed links, means for advancing the stock by successive steps; means for bending the stock into a hook; mechanism for severing the stock to transform the hook into a staple-shaped link; means for fashioning engaging elements in the arms of the link; and means for retracting the stock between said steps and prior to the severing of the stock thereby to concatenate the bend of the link with the engaging elements of a preceding link, and to aline the end of the hook with the severing mechanism thereby to produce a link having arms of equal length, when the stock is severed by the severing mechanism.

3. In a machine for making bed fabric out of stock, releasable means for advancing the stock by successive steps; a stock-advanced carriage; and yieldable means connected with the carriage and tensioned by the advancing movement of the carriage to retract the carriage between said steps.

4. In a machine for making bed fabric out of stock, a movable member for advancing the stock; releasable means upon the movable member for holding the stock while the same is being advanced; and means for retracting the stock subsequent to the release of the holding means from the stock.

5. In a machine for making bed fabric out of stock, a movable member for advancing the stock; releasable means on the movable member for holding the stock while the same is being advanced; and yieldable means actuated by the stock during the advancement thereof, to retract the stock subsequent to the release of the holding means from the stock.

6. In a machine for making bed fabric out of stock, a movable member for advancing the stock; releasable means on the movable member for holding the stock; a stock engaging carriage adapted to advance with the stock; and yieldable means connected with the carriage to retract the carriage and the stock subsequent to the release of the holding means from the stock.

7. In a machine for making bed fabric out of stock, a movable member for advancing the stock; releasable means on the movable member for holding the stock while the same is being advanced; a slidably mounted carriage having means for holding the stock frictionally; and means for retracting the carriage.

8. In a machine for making bed fabric out of stock, a movable member for advancing the stock; releasable means upon the movable member for holding the stock while the same is being advanced; a slidably mounted carriage having means for engaging the stock frictionally; and a spring connected with the carriage to retract the carriage and the stock subsequent to the release of the holding means from the stock.

9. In a machine for making bed fabric out of stock, a slidably mounted cross head; a stock engaging grip movable upon the cross head and coöperating with the cross head to hold the stock while the stock is being advanced; a guiding mechanism; a carriage mounted to slide on the guiding mechanism; friction rollers on the carriage and adapted to engage the stock; a spring connected at one end with the carriage; and means for securing the other end of the spring.

10. In a device for making bed fabric out of stock, primary means for advancing the stock; secondary means for imparting step by step advancement to the stock; and a common means for simultaneously rendering both the primary and secondary means inoperable to advance the stock.

11. In a device for making bed fabric out of stock, a primary means for advancing the stock, the primary means comprising a pair of rotatable elements, one of which is yieldably supported; a secondary means for imparting a step by step advancement to the stock; and a device for rendering the secondary means inoperable to advance the stock, said device including means for engaging the yieldably supported rotatable element to space the same from the other rotatable element.

12. In a machine for making bed fabric out of stock, a primary means for advancing the stock and comprising a pair of rotatable members, one of which is yieldably supported; a pitman including a wedge movable between the rotatable members; a secondary means for imparting step by step advancement to the stock; and means under the control of the pitman for rendering the secondary means inoperable to advance the stock.

13. In a machine for making bed fabric out of stock, coöperating rotatable members adapted to engage the stock, one rotatable member being yieldably supported, and a wedge insertible between the rotatable members to effect a separation of the rotatable members.

14. In a device for making bed fabric out of stock, a slidably mounted cross head; a stock engaging grip movable on the cross head; a pivoted trip with which the grip engages, the trip being tiltable to cause the grip to engage the stock; a movable member adapted to coöperate with the trip to render the grip inactive; a stock feeding means including rotatable elements, one of which is yieldably supported; an actuating member operatively connected with the movable member; and a lifting device on the actuating member and coöperating with the yieldably supported rotatable element.

15. In a machine for making bed fabric out of stock, a slidably mounted cross head having means for engaging the stock to advance the stock; means for fashioning the stick into links; means for concatenating the links into a chain; and means directly operable by the cross head for advancing the chain.

16. In a machine for making bed fabric out of stock, a slidably mounted cross head having means for engaging the stock; means for fashioning the stock into links; means for concatenating the links into a chain; a rod connected with the cross head; and means mounted on the rod and engaging the chain to advance the chain.

17. In a machine for making bed fabric out of stock, a slidably mounted cross head; means on the cross head for engaging the stock to advance the stock when the cross head is moved; means for shaping the stock into links; means for concatenating the links into a chain; an actuating member connected directly with the cross head; a support adjustable upon the actuating member; means for holding the support in adjusted positions on the actuating member; and a chain-engaging dog pivoted to the support.

18. In a machine for making bed fabric out of stock, a slidably mounted cross head; stock engaging means on the cross head; an actuating member connected directly with the cross head; means for fashioning the stock into links; means for concatenating the links into a chain; a dog pivotally supported by the actuating member and adapted to engage the chain; and a spring connected with the dog and fixed with respect to the actuating member.

19. In a machine for making bed fabric out of stock, a bending member engaging the stock to form the same into a loop; a cutting member having means for severing the loop and for forming engaging elements in the loop; and compression mechanism for shaping the loop into a link, the compression mechanism constituting means for holding one link while another is being engaged therewith; the bending member and the compression mechanism being movable toward and away from each other to permit a variation in the length of the link.

20. In a machine for making bed fabric out of stock, the combination with a supporting structure, of a pair of members mounted thereon and movable toward and away from each other; means for holding the movable members in adjusted positions with respect to each other; a bending shaft journaled in one movable member; a die and an anvil carried by the other movable member; and a combined bending and cutting element journaled for rotation between the movable members.

21. In a machine for making bed fabric out of stock, a rotatable stock bending shaft having an opening in its side; a closure for the opening; a shaft having means for severing the stock after the same is bent; and means operable by the severing shaft for actuating the closure with respect to the opening.

22. In a machine for making bed fabric out of stock, a link holding means; means for bending the stock into a loop; an incline along which the stock is adapted to travel, to engage the bend in the stock with a link in the link holding means; and a yieldably depressed compression element operating above incline.

23. In a device of the class described, an anvil and a die coöperating with the anvil to shape a link; a compression element adapted to engage the link to hold down the same when the die is elevated with respect to the anvil; and means for varying the pressure exerted by the compression element on the link.

24. In a device of the class described, means for fashioning links and concatenating the links into a chain; a support having a recess through which the chain passes; an actuating member including a chain moving dog operating in the recess; and spaced elements upon which the dog is adapted to ride as the actuating member is reciprocated.

25. In a machine for making bed fabric out of stock, a slidable cross head adapted to advance the stock; means for fashioning the stock into links; means for concatenating the links into a chain; spaced elements receiving the chain in convolutions; means for applying cross ties to the convolutions of the chain; a hammer for clenching the cross ties on the chain; a movable carriage constituting means for actuating the hammer; and means for actuating the carriage from the cross head.

26. In a device for making bed fabric out of stock, a slidable cross head adapted to advance the stock; means for fashioning the stock into links; means for concatenating the links into a chain; spaced elements receiving the chain in convolutions; means for applying cross ties to the convolutions of the chain; a hammer for clenching the cross ties on the chain; a movable carriage constituting means for actuating the hammer; a movable member connected with the cross head; means for connecting the said movable member operatively with the carriage; and means on the movable member for advancing the chain before the chain is received by the said spaced elements.

27. In a device for making a bed fabric out of a chain and cross ties, spaced members about which the chain is trained in convolutions to receive the cross ties; coöperating elements comprising a fixed frame and an anvil, one of which coöperating elements is located between the spaced members, the other of which coöperating elements is located beyond the spaced members; a cross tie hammer coöperating with the anvil and movable in the frame; and a carriage slidable in the frame and operatively connected with the hammer to actuate the hammer.

28. In a machine for making bed fabric out of a chain and cross ties, spaced members about which the chain is trained in convolutions to receive the cross ties; coöperating elements comprising a fixed frame and an anvil, one of which coöperating elements is located between the spaced members, the other of which coöperating elements is located beyond the spaced members; a cross tie hammer coöperating with the anvil and movable in the frame; a carriage slidable in the frame and operatively connected with the hammer to actuate the hammer; a chain engaging stop latch movable upon the frame; means for retracting the latch; and means on the carriage for advancing the latch when the carriage is moved in one direction.

29. In a device for making bed fabric out of a chain and cross ties, spaced members about which the chain is trained in convolutions to receive the cross ties; coöperating elements comprising a fixed frame and an anvil, one of which coöperating elements is located between the spaced members, the other of which coöperating elements is located beyond the spaced members; a cross tie hammer coöperating with the anvil and movable in the frame; a carriage slidable on the frame and operatively connected with the hammer to actuate the hammer; a chain stop movable upon the frame; and means upon the carriage for actuating the chain stop.

30. In a device for making a bed fabric out of a chain and cross links, means for disposing the chain into spaced outer, inner and intermediate lengths; means for connecting the remote ends of a pair of cross ties with the inner and outer lengths of the chain; means for connecting the adjacent ends of the pair of cross ties with the intermediate length of the chain; means for tightening the cross ties in the direction of their lengths; and means for clenching the adjacent ends of the cross ties, after the same are tightened.

31. In a device for making a bed fabric out of a chain and cross ties, means for disposing the chain in spaced outer, inner and intermediate lengths; means for connecting the remote ends of a pair of cross ties with the inner and outer lengths of the chain; means for connecting the adjacent ends of the cross ties with the intermediate length of the chain; a guide engaging the other end of one cross tie; clenching mechanism adapted to engage the adjacent ends of the cross ties; a yieldable arm on the clenching mechanism and adapted to coöperate with the lower length of the chain; a fixed member, the fixed member and the arm being mutually inclined to effect a tightening of the cross ties in the direction of their lengths.

32. In a device for making a bed fabric out of a chain and cross ties, means for disposing the chain in spaced outer, inner and intermediate lengths; means for connecting the remote ends of a pair of cross ties with the inner and outer lengths of the chain; means for connecting the adjacent ends of the cross ties with the intermediate length of the chain; a guide engaging the remote end of one cross tie; a reciprocating carriage; a hammer coacting with the adjacent ends of the cross ties; means for operatively connecting the hammer with the carriage; a yieldable arm on the hammer and engaging the outer length of a chain; a fixed member; the fixed member and the arm being mutually inclined to effect the tightening of the cross ties in the direction of their lengths.

33. In a device of the class described, spaced drums; a belt connecting the drums; a guide carried by the belt and disposed transversely of the belt; a chain receiving support mounted to slide on the guide; and means for sliding the support on the guide when the guide and the support are moved with the belt.

34. In a device of the class described, a frame, a pair of drums thereon; a belt passed about the drums; a guide mounted on the belt; a chain receiving support adapted to slide on the guide; a track on the frame; means on the guide for coöperating with the track to prevent a depression of the guide; and means for moving the support on the guide when the belt is actuated.

35. In a device of the class described, a frame; drums on the frame; a belt passed about the drums; a guide attached to the belt; a chain support mounted to slide on the guide; tracks on the frame at opposite sides thereof; means on the guide for co-acting with the tracks to prevent a movement of the guide in the direction of its length; means upon one side of the frame for moving the support upon the guide in the direction of its length; a track upon the other side of the frame; and an element on the support adapted to engage the last specified track to limit the movement of the support in the direction of its length.

36. In a device of the class described, a frame; dums thereon; a belt passed about the drums; a guide connected with the belt; a chain support mounted to slide on the guide; a cam strip on the frame; and means on the support for engaging the cam strip to effect a movement of the support in the direction of its length.

37. In a device of the class described, a frame; drums thereon; a belt passed about the drums; a guide carried by the belt; a support mounted to slide on the guide; a cam strip on one side of the frame; a track on the other side of the frame; and a member on the support, adapted to coact with the cam strip to effect a longitudinal movement of the support, and adapted to coact with the track to resist the longitudinal movement of the support.

38. In a device for making a bed fabric out of a chain and cross ties, means for disposing the chain in spaced lengths; means for engaging one end of the cross tie with one length of the chain; means for swinging the other end of the cross tie to cause the same to interlock with the other length of the chain; and means for holding said other length of the chain against movement under the pressure of the cross tie.

39. In a device for making a bed fabric out of a chain of cross ties, means for arranging the chain in spaced lengths; means for applying one end of a cross tie to one length of the chain; a pair of members movable in opposite directions, one of said members being adapted to force the cross tie inwardly to cause the other end of the tie to interlock with the other length of the chain, the other of said members being outwardly movable to resist the inward movement of the cross tie; and means for simultaneously actuating the said pair of members.

40. In a cross tie applying mechanism, a lever provided with an angular finger; a fulcrum for the lever; a bracket; a link pivoted to the bracket; an arm connected with the link and mounted to slide on the bracket; and an operative connection between the lever and the link.

41. In a cross tie applying mechanism, a lever having an angular finger; a support for the lever; a pair of pivotally connected links, one of said links being pivotally connected with the lever; a support for the other link; an arm pivoted to the links; and a fixed support upon which the arm is mounted to slide.

42. In a device for making bed fabric out of a chain, spaced drums around which the chain is wound, the drums having grooves adapted to receive and support the chain; a chain support having means for receiving the ends of the chain when the chain is severed; and means for moving the support in a direction substantially parallel to the axes of the drums.

43. In a device of the class described, a stock-advancing cross-head; means for shaping the stock into links; means for concatenating the links into a chain; a chain-feeding means directly operable by the cross-head; and a common means for actuating the cross-head and the link-shaping means.

44. In a device of the class described, a stock-bending member; a shaft operatively connected with the bending member; a link-shaping means; and mechanism for actuating the link-shaping means, said mechanism comprising an arched crank on the shaft and an arched link pivoted to the crank, the crank and the link being adapted to lie in approximate alinement at a point in the travel of the crank, to permit the end of the stock to pass through the crank and the link when the stock is acted upon by the bending member.

In testimony that I claim the foregoing as my own, I have hereto affixed my signature in the presence of two witnesses.

GARY B. SMITH.

Witnesses:
SELINA WILLSON,
I. E. SIMPSON.

Copies of this patent may be obtained for five cents each, by addressing the "Commissioner of Patents, Washington, D. C."